(12) United States Patent
Kumar et al.

(10) Patent No.: US 10,102,734 B2
(45) Date of Patent: *Oct. 16, 2018

(54) TRACKING DEVICE LOCATION AND MANAGEMENT

(71) Applicant: Tile, Inc., San Mateo, CA (US)

(72) Inventors: Mayank Kumar, San Francisco, CA (US); Abhishek Gupta, San Mateo, CA (US)

(73) Assignee: Tile, Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/875,181

(22) Filed: Jan. 19, 2018

(65) Prior Publication Data

US 2018/0144608 A1 May 24, 2018

Related U.S. Application Data

(63) Continuation of application No. 15/253,617, filed on Aug. 31, 2016, now Pat. No. 9,911,311.

(51) Int. Cl.
*G08B 21/24* (2006.01)
*H04W 4/02* (2018.01)

(52) U.S. Cl.
CPC .............. *G08B 21/24* (2013.01); *H04W 4/02* (2013.01)

(58) Field of Classification Search
CPC ......... G08B 21/24; G08B 19/00; H04W 4/02; H04W 4/021; H04W 12/02; H04W 12/06; H04L 63/08; H04L 43/10; G06F 3/167; G06F 3/0482; G06Q 30/0261; G06Q 30/267; G06Q 30/0633; G01S 5/0205
See application file for complete search history.

(56) References Cited

U.S. PATENT DOCUMENTS

| | | | |
|---|---|---|---|
| 6,445,409 B1 | 9/2002 | Ito et al. | |
| 9,712,967 B2 | 7/2017 | Kostka et al. | |
| 9,900,732 B2* | 2/2018 | Dicke | H04W 4/02 |
| 9,911,311 B1* | 3/2018 | Kumar | H04W 4/02 |
| 2007/0262861 A1 | 11/2007 | Anderson et al. | |
| 2010/0279712 A1* | 11/2010 | Dicke | G01S 5/0205 |
| | | | 455/456.5 |
| 2011/0121964 A1* | 5/2011 | Bannard | G08B 21/24 |
| | | | 340/539.13 |
| 2013/0141233 A1 | 6/2013 | Jacobs et al. | |
| 2014/0073262 A1 | 3/2014 | Gutierrez et al. | |

(Continued)

*Primary Examiner* — An T Nguyen
(74) *Attorney, Agent, or Firm* — Fenwick & West LLP

(57) ABSTRACT

A tracking system determines that a first device of an owner of a tracking device is not within a proximity of the tracking device, that a second device is within a proximity of the tracking device, and whether a tracking application is not running on the first device. Responsive to determining that the tracking application is not running on the first device, the tracking system generates a notification informing the owner that the tracking application is not running on the first device. Responsive to determining that a location of the second device within a proximity of the tracking device is more than a threshold distance from a last known location of the tracking device, the tracking system generates a another notification informing the owner that the tracking device may be lost. The tracking system provides one or both of the notifications to the first device for display to the owner.

21 Claims, 6 Drawing Sheets

(56) References Cited

U.S. PATENT DOCUMENTS

2014/0173439 A1\* 6/2014 Gutierrez .............. G08B 21/24
                                                              715/727
2014/0273921 A1   9/2014 Li et al.
2018/0144608 A1\* 5/2018 Kumar ................... G08B 21/24

\* cited by examiner

TRACKING DEVICE LOCATION AND MANAGEMENT

CROSS REFERENCE TO RELATED APPLICATIONS

This application is a continuation of U.S. application Ser. No. 15/253,617, filed Aug. 31, 2016, now U.S. Pat. No. 9,911,311, which is incorporated by reference in its entirety.

BACKGROUND

This disclosure relates generally to tracking devices, and more specifically, to locating a tracking device and managing tracking device notifications.

Users can attach tracking devices to one or more personal objects, such as keys, a phone, a car, a briefcase, and the like. The tracking device can communicatively couple to a mobile device of the user (or of a community member) if a mobile device application corresponding to the tracking device is running on the mobile device. The mobile device can, in response to receiving a communication from the tracking device, determine a location of the mobile device (for instance, via a GPS receiver of the mobile device). The mobile device can then provide an identifier for the tracking device and the determined location of the mobile device to a cloud server, which can associate the tracking device with the determined location of the mobile device. However, if a user's mobile device is not currently running an application corresponding to the tracking device, the user's mobile device may be unable to communicate with the tracking device, requiring the user to rely on community members with mobile devices running the application in order to locate the tracking device.

SUMMARY

A central tracking system determines that a mobile device of an owner of a tracking device is not within a proximity of the tracking device. The central tracking system further determines that a community mobile device is within a proximity of the tracking device. The central tracking system then determines whether a tracking application associated with the tracking device is not running on the mobile device of the owner. The tracking application is configured to receive communications from the tracking device, to determine a location of the mobile device of the owner based on the received communications, and to provide the location of the mobile device of the owner and an identity of the tracking device to the central tracking system.

Responsive to determining that the tracking application is not running on the mobile device of the user, the central tracking system generates a notification informing the owner that the tracking application is not running. Furthermore, responsive to determining that a location of the community mobile device within the proximity of the tracking device is more than a threshold distance away from a last known location of the tracking, the central tracking system generates another notification informing the owner that the tracking device may be lost. The central tracking system provides one or both of the notifications to the mobile device of the owner for display to the owner.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Environment Overview

Embodiments described herein detail functionality associated with a tracking device. A user can attach a tracking device to or enclose the tracking device within an object, such as a wallet, keys, a car, a bike, a pet, or any other object that the user wants to track. The user can then use a mobile device (e.g., by way of a software application installed on the mobile device) or other device or service to track the tracking device and corresponding object. For example, the mobile device can perform a local search for a tracking device attached to a near-by object. However, in situations where the user is unable to locate the tracking device using their own mobile device (e.g., if the tracking device is beyond a distance within which the mobile device and the tracking device can communicate), the user can leverage the capabilities of a community of users of a tracking device system.

In particular, a tracking system (also referred to herein as a "cloud server" or simply "server") can maintain user profiles associated with one or more users of the tracking system. The tracking system can associate each user within the system with one or more tracking devices associated the user (e.g., tracking devices that the user has purchased and is using to track objects owned by the user). If the user's object becomes lost or stolen, the user can send an indication that the tracking device is lost to the tracking system, which is in communication with one or more mobile devices associated with the community of users in communication with the system. The tracking system can set a flag indicating the tracking device is lost. When one of a community of mobile devices that are scanning for nearby tracking devices and providing updated locations to the tracking system identifies a flagged tracking device, the tracking system can associate the received location with the flagged tracking device, and relay the location to a user of the tracking device, thereby enabling the user to locate the lost tracking device.

Figure 1:
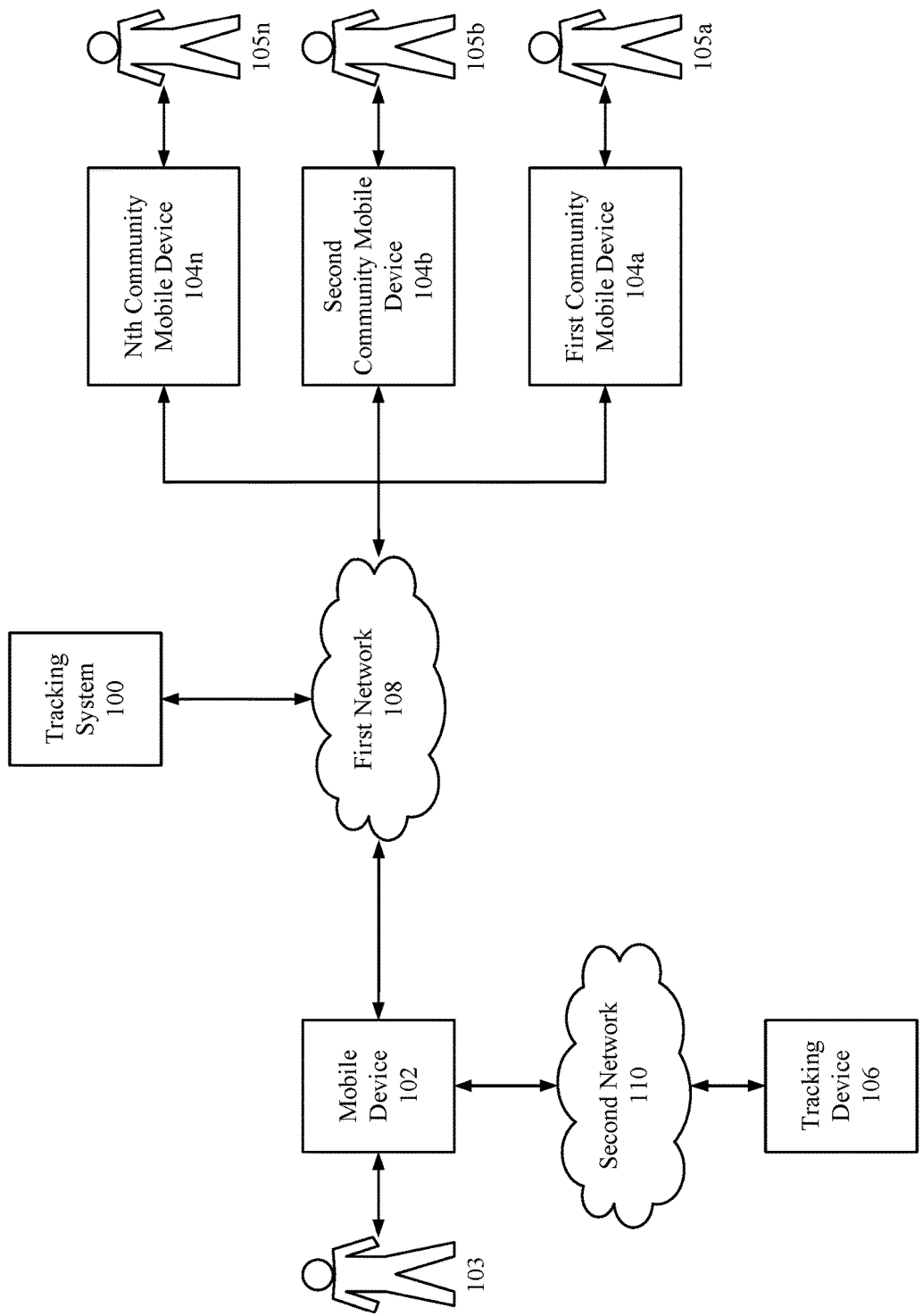
FIG. 1 illustrates an example tracking system environment in which a tracking device can operate, according to one embodiment.

FIG. 1 illustrates an example tracking system environment in which a tracking device can operate, according to one embodiment. The environment of FIG. 1 includes a tracking system 100 communicatively coupled to a mobile device 102 associated with a user 103 via a first network 108. The tracking system 100 is also communicatively coupled to community mobile devices 104a through 104n (collectively referred to herein as "community mobile devices 104") associated with users 105a through 105n of the tracking system 100 (collectively referred to herein as "community users 105") via the first network 108. As will be explained in more detail below, the tracking system 100 can allow the user 103 to manage and/or locate the tracking device 106 associated with the user 103. In some embodiments, the tracking system 100 leverages the capabilities of community mobile devices 104 to locate the tracking device 106 if the location of the tracking device 106 is unknown to the user 103 and beyond the capabilities of mobile device 102 to track. In some configurations, the user 103 may own and register multiple tracking devices 106. Although FIG. 1 illustrates a particular arrangement of the tracking system 100, the mobile device 102, the community mobile devices 104, and the tracking device 106, various additional arrangements are possible.

In some configurations, the user 103 may be part of the community of users 105. Further, one or more users 105 may own and register one or more tracking devices 106. Thus, any one of the users within the community of users 105 can communicate with the tracking system 100 and leverage the capabilities of the community of users 105 in addition to the user 103 to locate a tracking device 106 that has been lost.

The tracking system 100, the mobile device 102, and the community mobile devices 104 may communicate using any communication platforms and technologies suitable for transporting data and/or communication signals, including known communication technologies, devices, media, and protocols supportive of remote data communications.

In certain embodiments, the tracking system 100, the mobile device 102, and the community mobile devices 104 may communicate via the first network 108, which may include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the tracking system 100, the mobile device 102, and the community mobile devices 104. The mobile device 102 and the community of mobile devices 104 may also be in communication with a tracking device 106 via a second network 110. The second network 110 may be a similar or different type of network as the first network 108. In some embodiments, the second network 110 includes a wireless network with a limited communication range, such as a Bluetooth or Bluetooth Low Energy (BLE) wireless network. In some configurations, the second network 110 is a point-to-point network including the tracking device 106 and one or more mobile devices that fall within a proximity of the tracking device 106. In such embodiments, the mobile device 102 and the community mobile devices 104 may only be able to communicate with the tracking device 106 if they are within a close proximity to the tracking device 106, though in other embodiments, the tracking device 106 can use long-distance communication functionality (for instance, a GSM transceiver) to communicate with either a mobile device 102/104 or the tracking system 100 at any distance. In some configurations, the mobile device 102 and the one or more community mobile devices 104 may each be associated with multiple tracking devices associated with various users.

As mentioned above, FIG. 1 illustrates the mobile device 102 associated with the user 103. The mobile device 102 can be configured to perform one or more functions described herein with respect to locating tracking devices (e.g., the tracking device 106). For example, the mobile device 102 can receive input from the user 103 representative of information about the user 103 and information about the tracking device 106. The mobile device 102 may then provide the received user information, tracking device information, and/or information about the mobile device 102 to the tracking system 100. Accordingly, the tracking system 100 is able to associate the mobile device 102, the user 103, and/or the tracking device 106 with one another. In some embodiments, the mobile device 102 can communicate with the tracking device 106 and provide information regarding the location of the tracking device 106 to the user 103. For example, the mobile device 102 can detect a communication signal from the tracking device 106 (e.g., by way of the second network 110) as well as a strength of the communication signal or other measure of proximity to determine an approximate distance between the mobile device 102 and the tracking device 106. The mobile device 102 can then provide this information to the user 103 (e.g., by way of one or more graphical user interfaces) to assist the user 103 to locate the tracking device 106. Accordingly, the user 103 can use the mobile device 102 to track and locate the tracking device 106 and a corresponding object associated with the tracking device 106. If the mobile device 102 is located beyond the immediate range of communication with the tracking device 106 (e.g., beyond the second network 110), the mobile device 102 can be configured to send an indication that a tracking device 106 is lost to the tracking system 100, requesting assistance in finding the tracking device 106. The mobile device 102 can send an indication of a lost tracking device 106 in response to a command from the user 103. For example, once the user 103 has determined that the tracking device 106 is lost, the user 103 can provide user input to the mobile device 102 (e.g., by way of a graphical user interface), requesting that the mobile device 102 send an indication that the tracking device 106 is lost to the tracking system 100. In some examples, the lost indication can include information identifying the user 103 (e.g., name, username, authentication information), information associated with the mobile device 102 (e.g., a mobile phone number, a unique mobile device identifier), information associated with the tracking device (e.g., a unique tracking device identifier), or a location of the user 103 (e.g., a GPS location of the mobile device 102 at the time the request is sent).

The tracking system 100 can be configured to provide a number of features and services associated with the tracking and management of one or more tracking devices and/or users associated with the tracking devices. For example, the tracking system 100 can manage information and/or user profiles associated with user 103 and community users 105. In particular, the tracking system 100 can manage information associated with the tracking device 106 and/or other tracking devices associated with the user 103 and/or the community users 105.

As mentioned above, the tracking system 100 can receive an indication that the tracking device 106 is lost from the mobile device 102. The tracking system 100 can then process the indication in order to help the user 103 find the tracking device 106. For example, the tracking system 100 can leverage the capabilities of the community mobile devices 104 to help find the tracking device 106. In particular, the tracking system 100 may set a flag for a tracking device 106 to indicate that the tracking device 106 is lost and monitor communications received from the community mobile devices 104 indicating the location of one or more tracking devices 106 within proximity of the community mobile devices 104. The tracking system 100 can determine whether a specific location is associated with the lost tracking device 106 and provide any location updates associated with the tracking device 106 to the mobile device 102. In one example, the tracking system 100 may receive constant updates of tracking device 106 locations regardless of whether a tracking device 106 is lost and provide a most recent updated location of the tracking device 106 in response to receiving an indication that the tracking device 106 is lost.

In some configurations, the tracking system 100 can send a location request associated with the tracking device 106 to each of the community mobile devices 104. The location request can include any instructions and/or information necessary for the community mobile devices 104 to find the tracking device 106. For example, the location request can include a unique identifier associated with the tracking device 106 that can be used by the community mobile devices 104 to identify the tracking device 106. Accordingly, if one of the community mobile devices 104 detects a communication from the tracking device 106 (e.g., if the community mobile device 104 is within a proximity or moves within a proximity of the communication capabilities of the tracking device 106 and receives a signal from the tracking device 106 including or associated with the unique identifier associated with the tracking device 106), the community mobile device 104 can inform the tracking system 100. Using the information received from the community mobile devices 104, the tracking system 100 can inform the user 103 (e.g., by way of the mobile device 102) of a potential location of the tracking device 106.

As shown in FIG. 1 and as mentioned above, the tracking system 100 can communicate with the community mobile devices 104 associated with corresponding community users 105. For example, an implementation may include a first community mobile device 104a associated with a first community user 105a, a second community mobile device 104b associated with a second community user 105b, and additional community mobile devices associated with additional community users up to an nth community mobile device 104n associated with an nth community user 105n. The community mobile devices 104 may also include functionality that enables each community mobile device 104 to identify a tracking device 106 within a proximity of the community mobile device 104. In one example, a first community mobile device 104a within proximity of a tracking device 106 can communicate with the tracking device 106, identify the tracking device 106 (e.g., using a unique identifier associated with the tracking device 106), and/or detect a location associated with the tracking device 106 (e.g., a location of the first mobile community mobile device 104a at the time of the communication with the tracking device 106). This information can be used to provide updated locations and/or respond to a location request from the tracking system 100 regarding the tracking device 106. In some embodiments, the steps performed by the first community mobile device 104a can be hidden from the first community user 105a. Accordingly, the first community mobile device 104a can assist in locating the tracking device 106 without bother and without the knowledge of the first community user 105a.

As mentioned above, the tracking system 100 can assist the user 103 in locating the tracking device 106. The tracking device 106 may be a chip, tile, tag, or other device for housing circuitry and that may be attached to or enclosed within an object such as a wallet, keys, purse, car, or other object that the user 103 may track. Additionally, the tracking device 106 may include a speaker for emitting a sound and/or a transmitter for broadcasting a beacon. In one configuration, the tracking device 106 may periodically transmit a beacon signal that may be detected using a nearby mobile device 102 and/or a community mobile device 104. In some configurations, the tracking device 106 broadcasts a beacon at regular intervals (e.g., one second intervals) that may be detected from a nearby mobile device (e.g., the mobile device 102, the community mobile device 104). The strength of the signal emitted from the tracking device 106 may be used to determine a degree of proximity to the mobile device 102 or community mobile device 104 that detects the signal. For example, a higher strength signal would indicate a close proximity between the tracking device 106 and the mobile device 102 and a lower strength signal would indicate a more remote proximity between the tracking device 106 and the mobile device 102, though in some embodiments, the tracking device 106 can intentionally vary the transmission strength of the beacon signal. In some cases, the strength of signal or absence of a signal may be used to indicate that a tracking device 106 is lost.

System Overview

Figure 2:
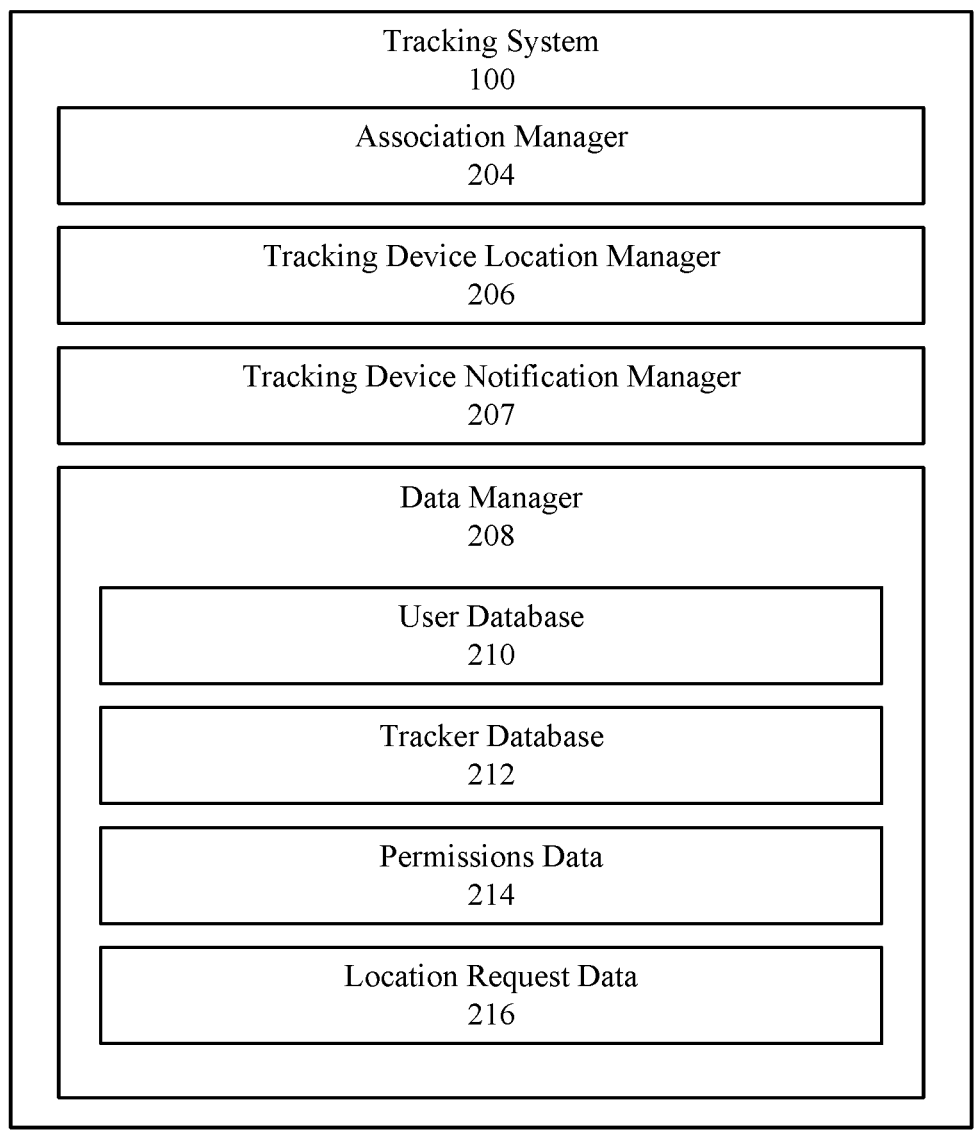
FIG. 2 illustrates an example tracking system for use in a tracking system environment, according to one embodiment.

FIG. 2 illustrates an example tracking system for use in a tracking system environment, according to one embodiment. As shown, the tracking system 100 may include, but is not limited to, an association manager 204, a tracking device location manager 206, a tracking device notification manager 207, and a data manager 208, each of which may be in communication with one another using any suitable communication technologies. It will be recognized that although managers 204-208 are shown to be separate in FIG. 2, any of the managers 204-208 may be combined into fewer managers, such as into a single manager, or divided into more managers as may serve a particular embodiment.

The association manager 204 may be configured to receive, transmit, obtain, and/or update information about a user 103 and/or information about one or more specific tracking devices (e.g., a tracking device 106). In some configurations, the association manager 204 may associate information associated with the user 103 with information associated with a tracking device 106. For example, user information and tracking device information may be obtained by way of a mobile device 102, and the association manager 204 may be used to link the user information and tracking device information. The association between user 103 and tracking device 106 may be used for authentication purposes, or for storing user information, tracking device information, permissions, or other information about a user 103 and/or tracking device 106 in a database.

The tracking system 100 also includes a tracking device location manager 206 (hereinafter referred to as "location manager 206"). The location manager 206 may receive and process an indication that the tracking device 106 is lost from a mobile device (e.g., mobile device 102 or community mobile devices 104). For example, the tracking system 100 may receive a lost indication from a mobile device 102 indicating that the tracking device 106 is lost. The location manager 206 may set a flag on a database (e.g., tracker database 212) indicating that the tracking device 106 is lost. The location manager 206 may also query a database to determine tracking information corresponding to the associated user 103 and/or tracking device 106. The tracking system 100 may obtain tracking device information and provide the tracking device information or other information associated with the tracking device 106 to the community mobile devices 104 to be on alert for the lost or unavailable tracking device 106.

The location manager 206 may also receive a location from one or more community mobile devices 104 that detect the tracking device 106, for instance in response to the community mobile device 104 receiving a beacon signal transmitted by the tracking device 106, without the tracking device 106 having been previously marked as lost. In such embodiments, the user 103 corresponding to the mobile device 102 can request a most recent location associated with the tracking device 106 from the tracking system 100, and the location manager 206 can provide the location received from the community mobile device 104 for display by the mobile device 102. In some embodiments, the location manager 206 provides the location of the tracking device 106 received from a community mobile device 104 either automatically (for instance if the tracking device 106 is marked as lost) or at the request of the user 103 of the mobile device 102 (for instance, via an application on the mobile device 102). The location manager 206 can provide a location of a tracking device 106 to the mobile device 102 via a text message, push notification, application notification, automated voice message, or any other suitable form of communication.

The location manager 206 may further manage providing indications about whether the tracking device 106 is lost or no longer lost. For example, as discussed above, the location manager 206 may provide a location request to the community of mobile devices 104 indicating that the tracking device 106 is lost. Additionally, upon locating the tracking device 106 by the user 103 or by one of the community of users 105, the location manager 206 may provide an indication to the user 103, the community user 105, or the tracking system 100 that the tracking device 106 has been found, thus removing any flags associated with a tracking device 106 and/or canceling any location request previously provided to the community of users 105. For example, where the user 103 sends an indication that the tracking device 106 is lost to the tracking system 100 and later finds the tracking device 106, the mobile device 102 may provide an indication to the tracking system 100 that the tracking device 106 has been found. In response, the location manager 206 may remove a flag indicating that the tracking device 106 is lost and/or provide an updated indication to the community of users 105 that the tracking device 106 has been found, thus canceling any instructions associated with the previously provided location request. In some configurations, the notification that the tracking device 106 has been found may be provided automatically upon the mobile device 102 detecting the tracking device 106 within a proximity of the mobile device 102. Alternatively, the notification that the tracking device 106 has been found may be provided by the user 103 via user input on the mobile device 102. In another example, a known user (e.g., a friend or family member) with whom the tracking device 106 has been shared may provide an indication that the tracking device 106 has been found.

The tracking system 100 additionally includes a tracking device notification manager 207 (hereinafter referred to as "notification manager 207"). The notification manager 207 is configured to generate and provide notifications based on one or more conditions being satisfied. For instance, the notification manager 207 may generate and provide notifications for display by the mobile device 102 of the user 103.

In some configurations, the notification manager 207 may track whether the mobile device 102 is connected to the tracking device 106, whether the mobile device 102 is within a proximity of the tracking device 106, when the mobile device 102 last updated a location of the tracking device 106 with the tracking system 100, and the last updated location of the tracking device 106. The last updated location of the tracking device 106 may be, for example, a location of the mobile device 102 at a most recent time the mobile device 102 received a communication from the tracking device 106.

In some embodiments, the notification manager 207 may determine a tracking application on the mobile device 102 for communicating with and locating the tracking device 106 is not running. The notification manager 207 may make the determination that the tracking application is not running on the mobile device 102 based on a notification received from the mobile device 102. Alternatively, the notification manager 207 can determine that the tracking application is not running on the mobile device 102 without receiving a notification from the mobile device, for instance based on a lack of communication from the mobile device 102. For example, the notification manager 207 may make the determination responsive to not receiving communication from the mobile device 102 for a threshold period of time.

The notification manager 207 may determine that the mobile device 102 is not connected to the tracking device 106, that a community mobile device 104 is within a proximity of the tracking device 106, and that the tracking application on the mobile device 102 is not running. Responsive to the determinations, the notification manager 207 may generate a notification informing the user 103 of the mobile device 102 associated with the tracking device 106 that the tracking application on the mobile device 102 is not running. The notification may include a message indicating that the tracking application is not running, a message suggesting to the user 103 to run the tracking application, and may provide an option that, when selected, launches or runs the tracking application on the mobile device 102. The message may further include an explanation of the benefits of running the tracking application on the mobile device 102, for instance the benefits of a community network and the benefits of being able to track the current location of the tracking device 106. The notification manager 207 may provide the generated notification to the mobile device 102.

In one embodiment, the notification manager 207 may determine that the mobile device 102 is not within a proximity of the tracking device 106, that the community mobile device 104 is within a proximity of the tracking device 106, and that a current location of the tracking device 106 is greater than a threshold distance away from the last updated location of the tracking device 106 by the mobile device 102. The current location of the tracking device 106 may be, for example, a location of the community mobile device 104 at a most recent time the community mobile device 104 received a communication from the tracking device 106. Responsive to the determinations, the notification manager 207 may generate a notification informing the user 103 of the mobile device 102 that the tracking device 106 may be lost or left behind by the user 103. The notification may include a message indicating the tracking device 106 may be lost or left behind by the user 103. The message may further include the last updated location of the tracking device 106 by the mobile device 102 and a timestamp associated therewith, the current location of the tracking device 106 and a timestamp associated therewith, and a number of community mobile devices 104 that have been within a proximity of the tracking device 106 since the last updated location of the tracking device 106 by the mobile device 102. The notification manager 27 may provide the generated notification to the mobile device 102.

In one embodiment, the notification manager 207 may determine that the mobile device 102 is not within a proximity of the tracking device 106, that the community mobile device 104 is within a proximity of the tracking device 106, and either that the current location of the tracking device 106 is less than a threshold distance away from the last updated location of the tracking device 106 by the mobile device 102 or that the current location is in a "safe zone." The safe zone is a boundary of geographic location in which the tracking device is considered to be "safe" or is considered to not be lost. The safe zone may be defined by the user 103 or may be defined by the notification manager 207 based on historical behavior of the tracking device 106 and/or other analytics related to the tracking device 106 and/or the user 103. Responsive to the determinations, the notification manager 207 may generate a notification informing the user 103 of the mobile device 102 to that the tracking application the tracking application on the mobile device 102 is not running. The notification may include a message indicating to make sure that the tracking application is running, and may include an option to launch or run the tracking application. Responsive to the notification manager 207 determining that the current location of the tracking device 106 is less than the threshold distance away from the last updated/known location of the tracking device 106, the notification manager 207 may generate another notification informing the user 103 that the tracking device 106 is located less than the threshold distance away from the last updated location. Responsive to the notification manager 207 determining that the current location is in the safe zone, the notification manager 207 may generate another notification informing the user 103 that the tracking device 106 is located within the safe zone. The notification manager 207 may provide the generated notifications to the mobile device 102. In one embodiment, the notification manager 207 may provide the generated notifications as a single notification to the mobile device 102, or may provide only one notification to the mobile device 102. It should be noted that in some embodiments, the notification manager 207 sends notifications to the mobile device 102 without determining whether the tracking application is running on the mobile device 102.

In one embodiment, the notification manager 207 may determine that the last updated location of the tracking device 106 by the mobile device 102 is greater than a threshold distance away from the current location of the tracking device 106 (e.g., the location of the community mobile device 104 at a most recent time the community mobile device 104 received a communication from the tracking device 106). Responsive to the determination, the notification manager 207 may generate a notification informing the user 103 of the mobile device 102 associated with the tracking device 106 that the tracking application on the mobile device 102 is not running, for instance without regard to whether the mobile device 102 is within the threshold proximity of the tracking device 106. The notification manager 207 may provide the generated notification to the mobile device 102.

In some configurations, the notification manager 207 may be further configured to send follow-up notifications to the user 103. The follow-up notifications may include instructions and/or recommendations for the user 103 such as, for example, recommendations to verify and/or turn on various services, such as data communication services, Bluetooth communication services, location services, and the like.

In some configurations, the notification manager 207 may be further configured to determine the state of each of the various services, such as the wireless functionality of the mobile device 102 (e.g., if one or more of the services are enabled, disabled, malfunctioning, and the like). The notification manager 207 may determine the state of each of the various services based on a notification from the mobile device 102 indicating such and/or based on a lack of communication from the mobile device 102. The notification manager 207 may provide feedback to the user 103 regarding the determined state of each of the various services.

In some configurations, the notification manager 207 may be further configured to process notifications from the mobile device 102 (e.g., from a notification engine 340 of the mobile device 102). In one example, responsive to receiving a notification indicating the user 103 has identified the tracking device 106 as lost, the notification manager 207 may set a flag on a database (e.g., tracker database 212) indicating the tracking device 106 is lost, and thus affirmatively classify the tracking device 106 as lost. In another example, responsive to receiving a notification indicating the user 103 has identified the tracking device 106 as not lost, the notification manager 207 may clear or reset any flag on the database indicating the tracking device 106 as lost, and thus affirmatively classify the tracking device 106 as not lost.

The tracking system 100 additionally includes a data manager 208. The data manager 208 may store and manage information associated with users, mobile devices, tracking devices, permissions, location requests, and other data that may be stored and/or maintained in a database related to performing location services of tracking devices. As shown, the data manager 208 may include, but is not limited to, a user database 210, a tracker database 212, permissions data 214, and location request data 216. It will be recognized that although databases and data within the data manager 208 are shown to be separate in FIG. 2, any of the user database 210, tracker database 212, permissions data 214, and location request data 216 may be combined in a single database or manager, or divided into more databases or managers as may serve a particular embodiment.

The data manager 208 may include the user database 210. The user database 210 may be used to store data related to various users. For example, the user database 210 may include data about the user 103 as well as data about each community user 105 in a community of users 105. The community of users 105 may include any user that has provided user information to the tracking system 100 via a mobile device 102, 104 or other electronic device. The user information may be associated with one or more respective tracking devices 106 for example by the association manager 204, or may be stored without an association to a particular tracking device 106. For example, a community user 105 may provide user information and permit performance of tracking functions on the community mobile device 104 without owning or being associated with a tracking device 106. The user database 210 may also include information about one or more mobile devices or other electronic devices associated with a particular user.

The data manager 208 may also include the tracker database 212. The tracker database 212 may be used to store data related to tracking devices. For example, the tracker database 212 may include tracking data for any tracking device 106 that has been registered with the tracking system 100. The tracking data may include unique tracker identifications (IDs) associated with individual tracking devices 106. The tracker IDs may be associated with a respective user 103. The tracker IDs may also be associated with multiple users. Additionally, the tracker database 212 may include any flags or other indications associated with whether a specific tracking device 106 has been indicated as lost and whether any incoming communications with regard to that tracking device 106 should be processed based on the presence of a flag associated with the tracking device 106.

The data manager 208 may further include the permissions data 214 and the location request data 216. The permissions data 214 may include levels of permissions associated with a particular user 103 and/or tracking device 106. For example, permissions data 214 may include additional users that have been indicated as sharing a tracking device 106, or who have been given permission to locate or receive a location of a tracking device 106. The location request data 216 may include information related to a location request or a lost indication received from the user 103 via the mobile device 102.

Figure 3:
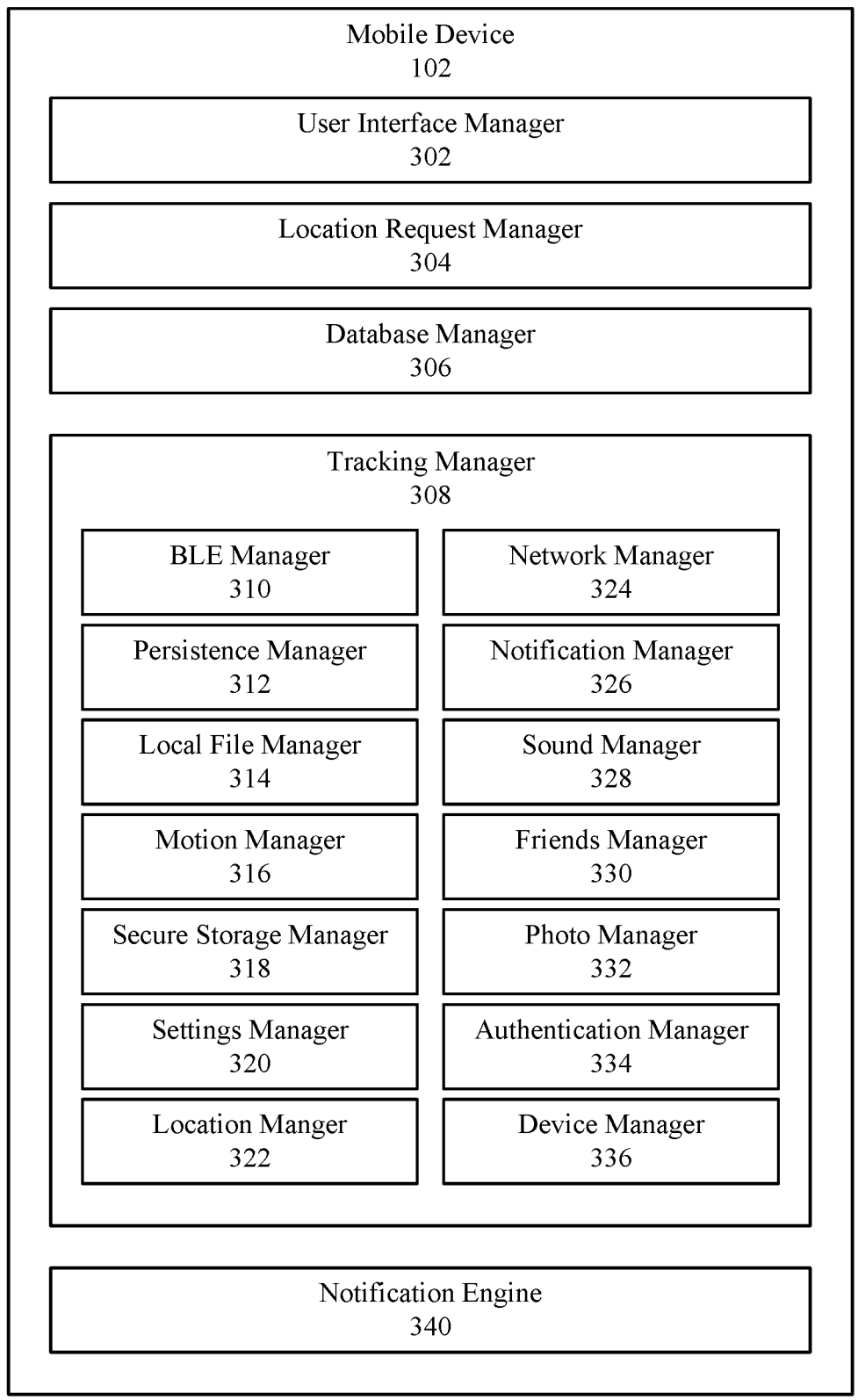
FIG. 3 illustrates an example user mobile device for use in a tracking system environment, according to one embodiment.

FIG. 3 illustrates an example user mobile device for use in a tracking system environment, according to one embodiment. As shown, the mobile device 102 may include, but is not limited to, a user interface manager 302, a location request manager 304, a database manager 306, a tracking manager 308, and a notification engine 340, each of which may be in communication with one another using any suitable communication technologies. It will be recognized that although managers 302-308 are shown to be separate in FIG. 3, any of the managers 302-308 may be combined into fewer managers, such as into a single manager, or divided into more managers as may serve a particular embodiment.

As will be explained in more detail below, the mobile device 102 may include the user interface manager 302 (hereinafter referred to as "UI manager 302"). The UI manager 302 may facilitate providing the user 103 access to data on a tracking system 100 and/or providing data to the tracking system 100. Further, the UI manager 302 provides a user interface (UI) by which the user 103 may communicate with tracking system 100 and/or tracking device 106 via mobile device 102. For example, the UI manager 302 can facilitate the providing of power settings to the tracking device 106 for power management on the tracking device 106 by the user 103.

The mobile device 102 may also include the location request manager 304. The location request manager 304 may receive and process a request input to the mobile device 102 to send an indication that a tracking device 106 is lost to a tracking system 100. For example, the user 103 may provide an indication that a tracking device 106 is lost, unreachable, or otherwise unavailable from the mobile device 102 via the UI manager 302, and the location request manager 304 may process the lost indication and provide any necessary data to the tracking system 100 for processing and relaying a location request to other users 105 over the first network 108. In some configurations, an indication that a tracking device 106 is lost is provided via user input. Alternatively, the indication may be transmitted automatically in response to the mobile device 102 determining that a tracking device 106 is lost.

In addition, the location request manager 304 can request a location of the tracking device 106 without the tracking device 106 being identified as lost. For instance, a user 103, 105 can access a tracking device location feature of an application running on the mobile device 102 (for example, via the user interface manager 302), and the location request manager 304 can request a most recent location of the tracking device 106 from the tracking system 100. The location request manager 304 can receive the most recent location from the tracking system 100, and can display the most recent location via the UI manager 302.

The mobile device 102 may also include the database manager 306. The database manager 306 may maintain data related to the user 103, tracking device 106, permissions, or other data that may be used for locating a tracking device 106 and/or providing a request to the tracking system 100 for locating one or more tracking devices 106 associated with the user 103. Further, the database manager 306 may maintain any information that may be accessed using any other manager on the mobile device 102.

The mobile device 102 may further include a tracking manager 308. The tracking manager 308 may include a tracking application (e.g., a software application) for communicating with and locating a tracking device 106 associated with the user 103. For example, the tracking manager 308 may be one configuration of a tracking application installed on the mobile device 102 that provides the functionality for locating a tracking device 106 and/or requesting location of a tracking device 106 using the tracking system 100 and/or the community mobile devices 104. As shown, the tracking manager 308 may include, but is not limited to, a Bluetooth Low Energy (BLE) manager 310, a persistence manager 312, a local files manager 314, a motion manager 316, a secure storage manager 318, a settings manager 320, a location manager 322, a network manager 324, a notification manager 326, a sound manager 328, a friends manager 330, a photo manager 332, an authentication manager 334, and a device manager 336. Thus, the tracking manager 308 may perform any of the functions associated with managers 310-336, described in additional detail below.

The BLE manager 310 may be used to manage communication with one or more tracking devices 106. The persistence manager 312 may be used to store logical schema information that is relevant to the tracking manager 308. The local files manager 314 may be responsible for managing all files that are input or output from the mobile device 102. The motion manager 316 may be responsible for all motion management required by the tracking manager 308. The secure storage manager 318 may be responsible for storage of secure data, including information such as passwords and private data that would be accessed through this sub-system. The settings manager 320 may be responsible for managing settings used by the tracking manager 308. Such settings may be user controlled (e.g., user settings) or defined by the tracking manager 308 for internal use (e.g., application settings) by a mobile device 102 and/or the tracking system 100. The location manager 322 may be responsible for all location tracking done by the tracking manager 308. For example, the location manager 322 may manage access to the location services of the mobile device 102 and works in conjunction with other managers to persist data. The network manager 324 may be responsible for all Internet communications from the tracking manager 308. For example, the network manager 324 may mediate all Internet application program interface (API) calls for the tracking manager 308. The notification manager 326 may be responsible for managing local and push notifications required by the tracking manager 308. The sound manager 328 may be responsible for playback of audio cues by the tracking manager 308. The friends manager 330 may be responsible for managing access to contacts and the user's social graph. The photo manager 332 may be responsible for capturing and managing photos used by the tracking manager 308. The authentication manager 334 may be responsible for handling the authentication (e.g., sign in or login) of users. The authentication manager 334 may also include registration (e.g., sign up) functionality. The authentication manager 334 further coordinates with other managers to achieve registration functionality. The device manager 336 may be responsible for managing the devices discovered by the tracking manager 308. The device manager 336 may further store and/or maintain the logic for algorithms related to device discovery and update.

The mobile device 102 may further include a notification engine 340. The notification engine 340 is configured to generate and/or display a notification to the user 103 associated with the tracking device 106. In some configurations, the notification engine 340 is configured to generate the notification without receiving a notification from the tracking system 100 and based on data received from the tracking system 100, such as proximity data, last known location data, and the like, and to display the generated notification. In other configurations, the notification engine 340 is configured to receive the notification from the tracking system 100 and to display the received notification. For the sake of simplicity, the following description relates to the notification engine 340 receiving the notification from the tracking system 100 and displaying the received notification.

The notification engine 340 may display a notification to the user 103 of the mobile device 102 indicating that a tracking application for communicating with and locating the tracking device 106 is not running. The notification may include a message indicating that the tracking application is not running. The message may further include an explanation of the benefits of running the tracking application on the mobile device 102, for instance the benefits of a community network and the benefits of being able to track the current location of the tracking device 106. The message may further include a message suggesting to the user 103 to run the tracking application, and provide an option that, when selected, launches the tracking application on the mobile device 102.

In one embodiment, the notification engine 340 may display a notification to the user 103 of the mobile device 102 indicating that the tracking device 106 may be lost of left behind. In some embodiments, the determination that the tracking device 106 may be lost or left behind may be made by the tracking system 100 and communicated to the mobile device 102 (e.g., the notification engine 340), may be made by a community mobile device 104 and communicated to the mobile device 102 (e.g., the notification engine 340), or may be made by the notification engine 340. The notification may include a message indicating the tracking device 106 may be lost or left behind by the user 103. The message may further include a last updated location of the tracking device 106 by the mobile device 102 and a timestamp associated therewith, a current location of the tracking device 106 and a timestamp associated therewith, and a number of community mobile devices 104 that have been within a proximity of the tracking device 106 since the last updated location of the tracking device 106 by the mobile device 102.

In some configurations, the notification engine 340 may be configured to determine the tracking application is not running. The notification engine 340 may generate and provide a notification to the tracking system 100 indicating the tracking application is not running. In one example, the notification engine 340 may be further configured to periodically generate and provide the notification to the tracking system 100 responsive to the tracking application running and to not generate and provide the notification to the tracking system 100 when the tracking application is not running.

In some configurations, the notification engine 340 may be further configured to display follow-up notifications to the user 103. The follow-up notifications may include instructions and/or recommendations for the user 103 such as, for example, recommendations to verify and/or turn on various services, such as data communication services, Bluetooth communication services, location services, and the like. The notification engine 340 may be further configured to determine the state of each of the various services (e.g., if one or more of the services are enabled, disabled, malfunctioning, and the like). The notification engine 340 may generate and provide a notification to the tracking system 100 indicating the state of each of the various services. In one example, the notification engine 340 may be further configured to periodically generate and provide the notification to the tracking system 100 responsive to a change in the state of the various services and to not generate and provide the notification to the tracking system 100 responsive to no change in the state of the various services.

In some configurations, the notification engine 340 may be further configured to process input from the user 103. In one example, the notification may include an option to disregard the notification. Responsive to receiving input from the user 103 to disregard or dismiss the notification, the notification engine 340 may stop displaying the notification on the mobile device 102. The notification engine 340 may also send a notification to the tracking system 100 (e.g. the notification manager 207) indicating the user 103 dismissed the notification.

In another example, the notification may indicate the tracking device 106 may be lost or left behind by the user 103. Responsive to receiving input from the user 103 selecting an option displayed by or associated with the notification to identify the tracking device 106 as not lost, the notification engine 340 may stop displaying the notification on the mobile device 102. The notification engine 340 may also generate and provide a notification to the tracking system 100 (e.g. the notification manager 207) indicating the user 103 has identified the tracking device 106 as not lost.

Likewise, in yet another example, responsive to receiving input from the user 103 selecting an option displayed by or associated with the notification to identify the tracking device 106 as lost, the notification engine 340 may stop displaying the notification on the mobile device 102. The notification engine 340 may also generate and provide a notification to the tracking system 100 (e.g. the notification manager 207) indicating the user 103 has identified the tracking device 106 as lost, and thus enabling the tracking system 100 to affirmatively classify the tracking device 106 as lost.

Figure 4:
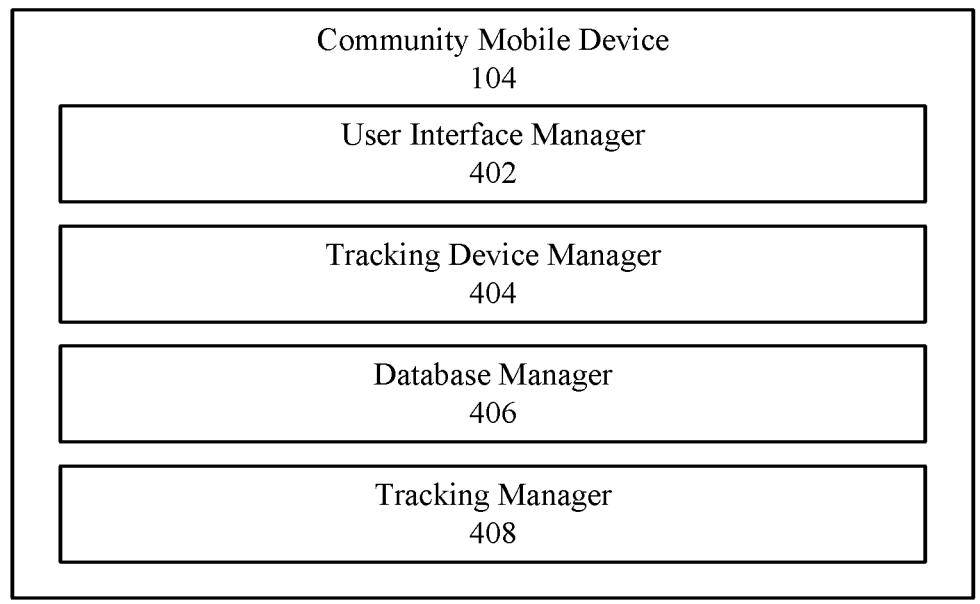
FIG. 4 illustrates an example community mobile device for use in a tracking system environment, according to one embodiment.

FIG. 4 illustrates an example community mobile device for use in a tracking system environment, according to one embodiment. As shown, the community mobile device 104 may include, but is not limited to, a user interface manager 402, a tracking device manager 404, a database manager 406, and a tracking manager 408, each of which may be in communication with one another using any suitable communication technologies. The user interface manager 402, database manager 406, and tracking manager 408 illustrated in FIG. 4 may include similar features and functionality as the user interface manager 302, database manager 306, and tracking manager 308 described above in connection with FIG. 3. It will be recognized that although managers 402-408 are shown to be separate in FIG. 4, any of the managers 402-408 may be combined into fewer managers, such as into a single manager, or divided into more managers as may serve a particular embodiment.

The community mobile device 104 may include a tracking device manager 404. The tracking device manager 404 may facilitate scanning for nearby tracking devices 106. In some configurations, the tracking device manager 404 can continuously or periodically scan (e.g., once per second) for nearby tracking devices 106. The tracking device manager 404 may determine whether to provide an updated location of the nearby tracking device 106 to the tracking system 100. In some configurations, the tracking device manager 404 provides a location of a nearby tracking device 106 automatically. Alternatively, the tracking device manager 404 may determine whether the location of the tracking device 106 has been recently updated, and may determine whether to provide an updated location based on the last time a location of the tracking device 106 has been updated (e.g., by the community mobile device 104). For example, where the community mobile device 104 has provided a recent update of the location of a tracking device 106, the tracking device manager 404 may decide to wait a predetermined period of time (e.g., 5 minutes) before providing an updated location of the same tracking device 106.

In one configuration, the tracking device manager 404 may receive and process a location request or other information relayed to the community mobile device 104 by the tracking system 100. For example, the tracking device manager 404 may receive an indication of a tracking device 106 that has been indicated as lost, and provide a location of the tracking device 106 if it comes within proximity of the community mobile device 104. In some configurations, the community mobile device 104 is constantly scanning nearby areas to determine if there is a tracking device 106 within a proximity of the community mobile device 104. Therefore, where a tracking device 106 that matches information provided by the tracking system 100 (e.g., from the location request) comes within proximity of the community mobile device 104, the tracking device manager 404 may generate and transmit a response to the location request to the tracking system 100, which may be provided to the user 103 associated with the tracking device 106. Further, generating and transmitting the response to the tracking request may be conditioned on the status of the tracking device 106 being flagged as lost by the mobile device 102 and/or the tracking system 100.

The tracking device manager 404 may additionally provide other information to the tracking system 100 in response to receiving the tracking request. For example, in addition to providing a location of the community mobile device 104, the tracking device manager 404 may provide a signal strength associated with the location to indicate a level of proximity to the location of the community mobile device 104 provided to the user 103. For example, if a signal strength is high, the location provided to the user 103 is likely to be more accurate than a location accompanied by a low signal strength. This may provide additional information that the user 103 may find useful in determining the precise location of tracking device 106.

As described above, the tracking device manager 404 may determine whether to send a location within the proximity of the tracking device 106 to the tracking system 100. The determination of whether to send a location to the tracking system 100 may be based on a variety of factors. For example, a tracking device manager 404 may determine to send a location of the tracking device 106 to a tracking system 100 based on whether the detected tracking device 106 has been indicated as lost or if a tracking request has been provided to the community mobile device 104 for the particular tracking device 106. In some configurations, the community mobile device 104 may send an update of a location of a tracking device 106 even if the tracking device 106 is not associated with a current tracking request or if the tracking device 106 is not indicated as lost. For example, where the location of a tracking device 106 has not been updated for a predetermined period of time, the community mobile device 104 may provide an update of a tracking device location to the tracking system 100, regardless of whether a tracking request has been received.

In some configurations, the community mobile device 104 may include additional features. For example, the community mobile device 104 may allow a tracking system 100 to snap and download a photo using photo functionality of the community mobile device 104. In some configurations, this may be an opt-in feature by which a community user 105 permits a tracking system 100 to take a snap-shot and possibly provide a visual image of an area within a proximity of the tracking device 106.

Figure 5:
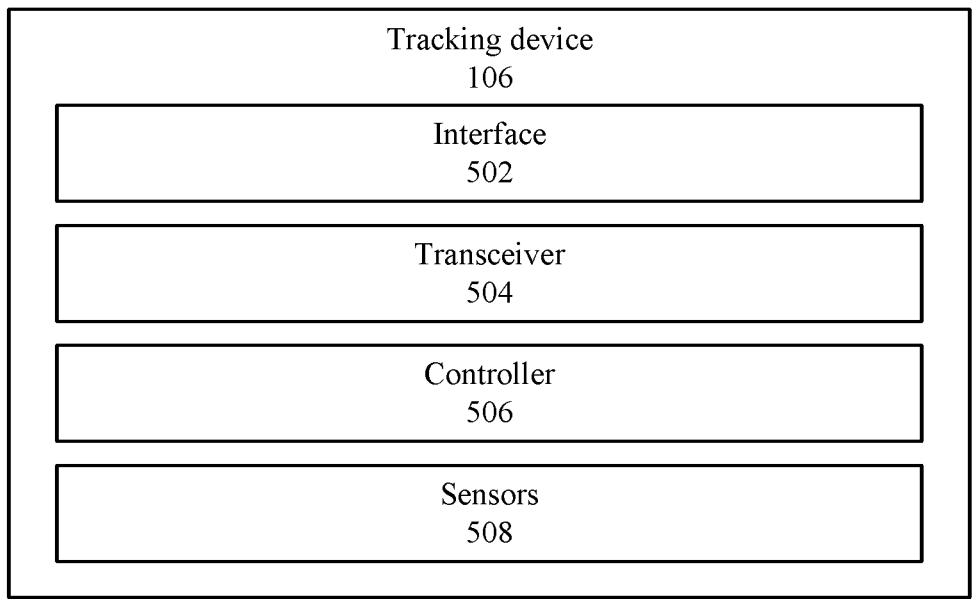
FIG. 5 illustrates an example tracking device for use in a tracking system environment, according to one embodiment.

FIG. 5 illustrates an example tracking device for use in a tracking system environment, according to one embodiment. The tracking device 106 of FIG. 5 includes an interface 502, a transceiver 504, a controller 506, and one or more sensors 508. The transceiver 504 is a hardware circuit capable of both transmitting and receiving signals. It should be noted that in other embodiments, the tracking device 106 includes fewer, additional, or different components than those illustrated in FIG. 5.

The interface 502 provides a communicative interface between the tracking device 106 and one or more other devices, such as a mobile device 102 and community mobile device 104. For instance, the interface 502 can instruct the transceiver 504 to broadcast beacon signals (for example, periodically or in response to a triggering event, such as a detected movement of the tracking device 106). The interface 502 can, in response to the receiving of signals by the transceiver 504 from, for instance, the mobile device 102, manage a pairing protocol to establish a communicative connection between the tracking device 106 and the mobile device 102. The transceiver 504 can include a BLE receiver and transmitter, though in other embodiments, the transceiver 504 enables communications via other suitable wireless connection protocols (such as WiFi, Global System for Mobile Communications or "GSM", LTE, and the like). It should be noted that while various examples herein describe the transceiver 504 as a GSM receiver and transmitter, this is done for the purposes of brevity, and it should be emphasized that the transceiver 504 can communicate over any other wireless communication protocol according to the embodiments described herein.

The controller 506 is a hardware chip that configures the tracking device 106 to perform one or more functions or to operate in one or operating modes or states. For instance, the controller 506 can configure the interval at which the transceiver 504 broadcasts beacon signals, can authorize or prevent particular devices from pairing with the tracking device 106 based on information received from the devices and permissions stored at the tracking device 106, can increase or decrease the transmission strength of signals broadcasted by the transceiver 504, can configure the interface 502 to emit a ringtone or flash an LED light, can enable or disable various tracking device sensors, can enable or disable communicative functionality of the tracking device 106, can configure the tracking device 106 into a sleep mode or awake mode, can configure the tracking device 106 into a power preservation mode, and the like. The controller 506 can configure the tracking device 106 to perform functions or to operate in a particular operating mode based on information or signals received from a device paired with or attempting to pair with the tracking device 106, based on an operating state or connection state of the tracking device 106, based on user-selected settings, based on information stored at the tracking device 106, based on a detected location of the tracking device 106, based on historical behavior of the tracking device 106 (such as a previous length of time the tracking device 106 was configured to operate in a particular mode), based on information received from the sensors 508, or based on any other suitable criteria.

The sensors 508 can include motion sensors (such as gyroscopes or accelerators), altimeters, GPS transceivers, orientation sensors, proximity sensors, communication sensors, light sensors, temperature sensors, pressure sensors, touch sensors, audio sensors, or any other suitable sensor configured to detect an environment of the tracking device 106, a state of the tracking device 106, a movement or location of the tracking device 106, and the like. The sensors 508 are configured to provide information detected by the sensors 508 to the controller 506, which in turn can provide the information detected by the sensors 508 to a mobile device 102 communicatively coupled to the tracking device 106.

Tracking Device Notification Overview

A user 103 can be notified that a tracking application on the mobile device 102 for communicating with and locating a tracking device 106 is not running, and/or that the tracking device 106 may be lost or left behind by the user 103, in order to ensure the tracking application is running and to provide instructions or recommendations to a user. The user 103 can be notified, for instance, via a notification displayed within a mobile device interface or application interface, via an audio signal or vibration signal from the mobile device 102, and the like.

In some embodiments, the notification can include information about a last known location of the tracking device 106 (for instance, displayed on a map displayed on the mobile device 102), can include information identifying the tracking device 106 (such as a name of the tracking device 106, the identity of the object to which the tracking device 106 is attached, or an icon corresponding to the tracking device 106), and can include text indicating why the tracking device is thought to be lost or left behind, and the like.

In some embodiments, the notification may include an option to disregard the notification. For instance, if the notification indicates the tracking application is not running, the user 103 may select an option displayed by or associated with the notification to disregard or otherwise dismiss the notification. Likewise, if the notification indicates that the tracking device 106 may be lost or left behind by the user 103, the user 103 may select an option displayed by or associated with the notification to identify the tracking device 106 as not lost. In some embodiments, the notification indicating that the tracking device 106 may be lost or left behind by the user 103 may include an option to confirm that the tracking device 106 is lost or left behind. In response to the selection of such an option, the tracking system 100 can affirmatively classify the tracking device 106 as lost.

Figure 6:
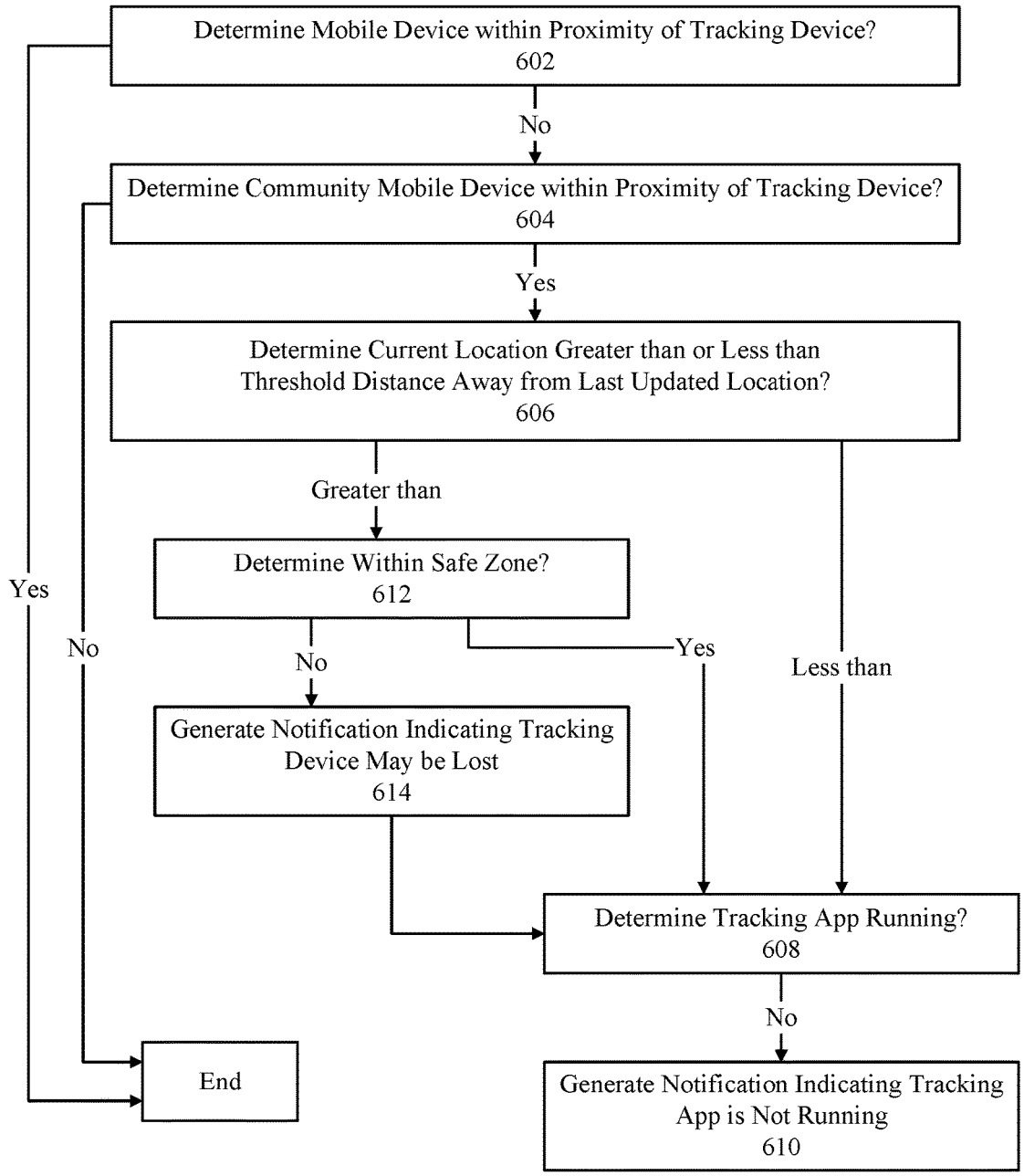
FIG. 6 illustrates a flow diagram illustrating a method of locating a tracking device, according to one embodiment.

Referring to FIG. 6, it illustrates a flow diagram of a method of locating a tracking device, according to one embodiment. The notification manager 207 of the tracking system 100 determines 602 whether the mobile device 102 is within a proximity of the tracking device 106. Responsive to the notification manager 607 determining 602 that the mobile device 102 is within a proximity of the tracking device 106, the notification manager 207 does not generate a notification for display on the mobile device 102 of the user 103 indicating that the tracking application on the mobile device 102 is not running. Responsive to the notification manager 207 determining 602 that the mobile device 102 is not within a proximity of the tracking device 106, the notification manager 207 determines 604 whether the community mobile device 104 is within a proximity of the tracking device 106.

Responsive to the notification manager 207 determining 604 that the community mobile device 104 is not within a proximity of the tracking device 106, the notification manager 207 does not generate a notification for display on the mobile device 102 of the user 103 indicating that the tracking application is not running. Responsive to the notification manager 207 determining 604 that the community mobile device 104 is within a proximity of the tracking device 106, the notification manager 207 determines 606 whether a current location of the tracking device 106 is greater than or less than a threshold distance away from a last updated location of the tracking device 106. The current location of the tracking device 106 may be, for example, a location of the community mobile device 104 at a most recent time that the community mobile device 104 received a communication from the tracking device 106. The last updated location of the tracking device 106 may be, for example, a location of the mobile device 102 at a most recent time the mobile device 102 received a communication from the tracking device 106.

Responsive to the notification manger 207 determining 606 that the current location of the tracking device 106 is less than a threshold distance away from the last updated location of the tracking device 106, the notification manager 207 determines 608 whether the tracking application on the mobile device 102 is running. Responsive to determining 608 the tracking application on the mobile device 102 is not running, the notification manager 207 generates 610 a notification for display on the mobile device 102 of the user 103 indicating that the tracking application is not running.

Responsive to the notification manager 207 determining 606 that the current location of the tracking device 106 is greater than a threshold distance away from the last updated location of the tracking device 106, the notification manager 207 determines 612 whether the current location is within a "safe zone." The safe zone is a boundary of geographic location in which the tracking device is considered to be "safe" or is considered to not be lost.

Responsive to the notification manager 207 determining 612 that the current location of the tracking device 106 is within a safe zone, the notification manager 207 determines 608 whether the tracking application on the mobile device 102 is running and proceeds as described above. Responsive to the notification manager 207 determining 612 that the current location of the tracking device 106 is not within the safe zone, the notification manager 207 generates 614 a notification for display on the mobile device 102 of the user 103 indicating that the tracking device 106 may be lost or left behind by the user 103. The notification manager 207 then determines 608 whether the tracking application on the mobile device 102 is running and proceeds as described above.

The sequence of steps as described above with reference to FIG. 6 is merely illustrative. For example, the notification manager 207 may determine 608 whether the tracking application on the mobile device 102 before it may determine 606 whether a current location of the tracking device 106 is greater than or less than a threshold distance away from a last updated location of the tracking device 106. Further, other operations may also be performed in addition to those described above with reference to FIG. 6. In one example, the notification manager 207 may provide one or both of the generated notification indicating the tracking application is not running and the generated notification indicating the tracking device 106 may be lost to the mobile device 102 for display to the user 103. In another example, the notification manager 207 may also send follow-up notifications to the user 103 including instructions and/or recommendations for the user 103 such as, for example, recommendations to verify and/or turn on various services, such as data communication services, Bluetooth communication services, location services, and the like.

The notifications described herein can beneficially enable a user 103 to know, for example, that the tracking application is not running and/or that the tracking device 106 may be lost or left behind by the user 103. The notifications may further beneficially enable the user 103 to know the benefits of running the tracking application on the mobile device 102 (e.g., the benefits of a community network and the benefits of being able to track the current location of the tracking device 106). The notifications may provide follow-up instructions/recommendations, and/or provide feedback to the user. The notifications may be displayed as text or may be displayed as system notifications, for example as a text message notification, an email notification, a default operating system notification, and the like.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for locating a tracking device, comprising:
   determining, by a central tracking system, that a tracking application associated with the tracking device is not running on a first device of an owner of the tracking device, the tracking application configured to receive communications from the tracking device, to determine a location of the first device based on the received communications, and to provide the location of the first device and an identity of the tracking device to the central tracking system; and
   in response to determining that the tracking application is not running on the first device:
      generating, by the central tracking system, a notification informing the owner that the tracking application is not running on the first device and including narrative text explaining that the first device is unable to track the tracking device while the tracking application is not running on the first device; and
      providing, by the central tracking system, the notification to the first device for display to the owner.

2. The method of claim 1, wherein the notification is provided by the central tracking system to the first device only in response to determining that a last known location of the tracking device is not located within a pre-determined geographic safe zone.

3. The method of claim 2, further comprising:
when the last known location of the tracking device is located within the pre-determined geographic safe zone, providing, by the central tracking system, a second notification information the owner that the tracking device is located within the pre-determined geographic safe zone.

4. The method of claim 1, further comprising:
in response to determining that the tracking application is not running on the first device:
in response to determining that 1) a second device is located within a communicative range of the tracking device, and that 2) the second device is located more than threshold away from the first device, providing, by the central tracking system, a second notification to the first device informing the owner that the tracking device may be lost.

5. The method of claim 1, wherein determining that the tracking application is not running on the first device comprises:
receiving, by the central tracking system, a notification from the first device indicating that the tracking application is not running on the first mobile device.

6. The method of claim 1, wherein determining that the tracking application is not running on the first device comprises:
in response to not receiving a notification from the first device indicating that the tracking application is running on the first mobile device for more than a predetermined period of time, determining, by the central tracking system, that the tracking application is not running on the first device.

7. The method of claim 1, wherein the notification includes one or more of: a last known location of the tracking device, information identifying the tracking device, an identity of an object which the tracking device is associated with, a narrative or text description of benefits of running the tracking application on the first device, a narrative or text description of benefits of a community network, and a narrative or text description of benefits of being able to track a current location of the tracking device.

8. A tracking server, comprising:
a non-transitory computer-readable storage medium storing executing instructions that, when executed, cause the tracking server to perform steps comprising:
determining that a tracking application associated with a tracking device is not running on a first device of an owner of the tracking device, the tracking application configured to receive communications from the tracking device, to determine a location of the first device based on the received communications, and to provide the location of the first device and an identity of the tracking device to the tracking server; and in response to determining that the tracking application is not running on the first device:
generating a notification informing the owner that the tracking application is not running on the first device and including narrative text explaining that the first device is unable to track the tracking device while the tracking application is not running on the first device; and
providing the notification to the first device for display to the owner; and
a processor configured to execute the instructions.

9. The tracking server of claim 8, wherein the notification is provided by the tracking server to the first device only in response to determining that a last known location of the tracking device is not located within a pre-determined geographic safe zone.

10. The tracking server of claim 9, wherein the instructions, when executed, cause the tracking server to perform further steps comprise:
when the last known location of the tracking device is located within the pre-determined geographic safe zone, providing a second notification information the owner that the tracking device is located within the pre-determined geographic safe zone.

11. The tracking server of claim 8, wherein the instructions, when executed, cause the tracking server to perform further steps comprise:
in response to determining that the tracking application is not running on the first device:
in response to determining that 1) a second device is located within a communicative range of the tracking device, and that 2) the second device is located more than threshold away from the first device, providing a second notification to the first device informing the owner that the tracking device may be lost.

12. The tracking server of claim 8, wherein determining that the tracking application is not running on the first device comprises:
receiving a notification from the first device indicating that the tracking application is not running on the first mobile device.

13. The tracking server of claim 8, wherein determining that the tracking application is not running on the first device comprises:
in response to not receiving a notification from the first device indicating that the tracking application is running on the first mobile device for more than a predetermined period of time, determining that the tracking application is not running on the first device.

14. The tracking server of claim 8, wherein the notification includes one or more of: a last known location of the tracking device, information identifying the tracking device, an identity of an object which the tracking device is associated with, a narrative or text description of benefits of running the tracking application on the first device, a narrative or text description of benefits of a community network, and a narrative or text description of benefits of being able to track a current location of the tracking device.

15. A non-transitory computer-readable storage medium storing executable computer instructions that, when executed by a hardware processor of a tracking server, cause the processor to perform steps comprising:
determining that a tracking application associated with a tracking device is not running on a first device of an owner of the tracking device, the tracking application configured to receive communications from the tracking device, to determine a location of the first device based on the received communications, and to provide the location of the first device and an identity of the tracking device to the tracking server; and
in response to determining that the tracking application is not running on the first device:
generating a notification informing the owner that the tracking application is not running on the first device and including narrative text explaining that the first device is unable to track the tracking device while the tracking application is not running on the first device; and providing the notification to the first device for display to the owner.

16. The non-transitory computer-readable storage medium of claim 15, wherein the notification is provided by the tracking server to the first device only in response to determining that a last known location of the tracking device is not located within a pre-determined geographic safe zone.

17. The non-transitory computer-readable storage medium of claim 16, wherein the instructions, when executed, cause the processor to perform further steps comprising:
when the last known location of the tracking device is located within the pre-determined geographic safe zone, providing a second notification information the owner that the tracking device is located within the pre-determined geographic safe zone.

18. The non-transitory computer-readable storage medium of claim 15, wherein the instructions, when executed, cause the processor to perform further steps comprising:
in response to determining that the tracking application is not running on the first device:
in response to determining that 1) a second device is located within a communicative range of the tracking device, and that 2) the second device is located more than threshold away from the first device, providing a second notification to the first device informing the owner that the tracking device may be lost.

19. The non-transitory computer-readable storage medium of claim 15, wherein determining that the tracking application is not running on the first device comprises:
receiving a notification from the first device indicating that the tracking application is not running on the first mobile device.

20. The non-transitory computer-readable storage medium of claim 15, wherein determining that the tracking application is not running on the first device comprises:
in response to not receiving a notification from the first device indicating that the tracking application is running on the first mobile device for more than a predetermined period of time, determining that the tracking application is not running on the first device.

21. The non-transitory computer-readable storage medium of claim 15, wherein the notification includes one or more of: a last known location of the tracking device, information identifying the tracking device, an identity of an object which the tracking device is associated with, a narrative or text description of benefits of running the tracking application on the first device, a narrative or text description of benefits of a community network, and a narrative or text description of benefits of being able to track a current location of the tracking device.

* * * * *

UNITED STATES PATENT AND TRADEMARK OFFICE
CERTIFICATE OF CORRECTION

PATENT NO. : 10,102,734 B2
APPLICATION NO. : 15/875181
DATED : October 16, 2018
INVENTOR(S) : Mayank Kumar and Abhishek Gupta Page 1 of 1

It is certified that error appears in the above-identified patent and that said Letters Patent is hereby corrected as shown below:

On the Title Page

In the Abstract (57), Line 12 delete "generates a another" and insert --generates another--.

In the Claims

Column 21, Line 5, Claim 3 delete "notification information the owner" and insert --notification informing the owner--.

Column 22, Lines 9-10, Claim 10 delete "notification information the owner" and insert --notification informing the owner--.

Column 23, Lines 12-13, Claim 17 delete "notification information the owner" and insert --notification informing the owner--.

Signed and Sealed this
Twenty-ninth Day of October, 2019

Andrei Iancu
*Director of the United States Patent and Trademark Office*